INVENTOR.
Louis C. Rubens

United States Patent Office 3,297,787
Patented Jan. 10, 1967

3,297,787
COPOLYMERS OF UNSATURATED DICARBOXYLIC ACID ANHYDRIDES AND VINYL COMPOUNDS
Louis C. Rubens, Midland, Mich., assignor to The Dow Chemical Company, Midland, Mich., a corporation of Delaware
Filed Apr. 26, 1963, Ser. No. 275,916
14 Claims. (Cl. 260—859)

This invention relates to the modification of copolymers of an $\alpha,\beta$-unsaturated dicarboxylic acid anhydride and a vinyl compound to produce unsaturated reactive pendant groups capable of copolymerization with the same or other types of vinyl monomers. More particularly, it has been discovered that backbone copolymers such as those of styrene and maleic anhydride can be reacted with a vinyl amine to produce a half amide of the anhydride groups with a pendant vinyl group which can be copolymerized with a vinyl monomer such as o-chlorostyrene.

Vinyl resins containing an acid anhydride group usually are brittle and do not have the toughness desired for coatings, adhesives, castings, laminates, foams, potting resins and fiber-reinforced panels.

According to my invention a backbone copolymer of a vinyl compound and an $\alpha,\beta$-unsaturated dicarboxylic acid anhydride such as a styrene-maleic anhydride copolymer is dissolved in a vinyl monomer, for example, o-chlorostyrene. Thereafter a vinyl amine such as vinyl benzyl amine is added to the polymer solution whereupon the amine is acylated with the anhydride groups, producing pendant vinyl groups on the copolymer molecules. Following the acylation step the solvent vinyl monomer copolymerizes with the copolymer at the reactive pendant vinyl groups, producing the improved copolymer. A free radical initiator such as benzoyl peroxide may be added to promote the copolymerization.

Backbone copolymers of various vinyl compounds and unsaturated acid anhydrides may be used to prepare these improved resins. Suitable vinyl compounds include styrene, α-methyl styrene, ethyl styrene, chlorostyrene, vinyl toluene, vinyl xylene, acrylonitrile, vinyl chloride, vinyl acetate, vinylidene chloride, methyl acrylate, ethyl acrylate, and methyl methacrylate. Suitable unsaturated anhydrides include those of maleic, citraconic, and itaconic acid.

The vinyl monomer used to dissolve the backbone copolymer prior to the acylation of the amine by the anhydride groups may be the same as the vinyl compound used in preparing the backbone copolymer or it may be another of the monomers which are suitable for preparing the copolymer as well as any of other monomers having an α-olefinic linkage such as the dialkyl fumarates and butadiene. The monomer must be one which is a solvent for the backbone copolymer.

Although vinyl benzyl amine is preferred I may use other vinyl amines which can be acylated with the anhydride group of the copolymer to produce a half amide having a pendant vinyl group. The amine may be aliphatic such as allylamine or it may be an aromatic amine such as vinyl benzyl amine and vinyl phenethylamine. The properties of the modified copolymer are influenced to some extent by the molecular structure of the amine, for example the length of the amine molecule determines the spacing between the chain segments of the modified copolymers. Accordingly, the properties of the finished resin can be regulated to some degree by the choice of amine.

The solvent vinyl monomer may be caused to polymerize with the pendant vinyl groups by heating the mixture, however the time required for polymerization may be shortened substantially by incorporating a free radical initiator such as benzoyl peroxide, dicumyl peroxide, azo bis isobutyronitrile and the like.

The properties of resins prepared according to this invention are illustrated in the drawings.

Figure 1:
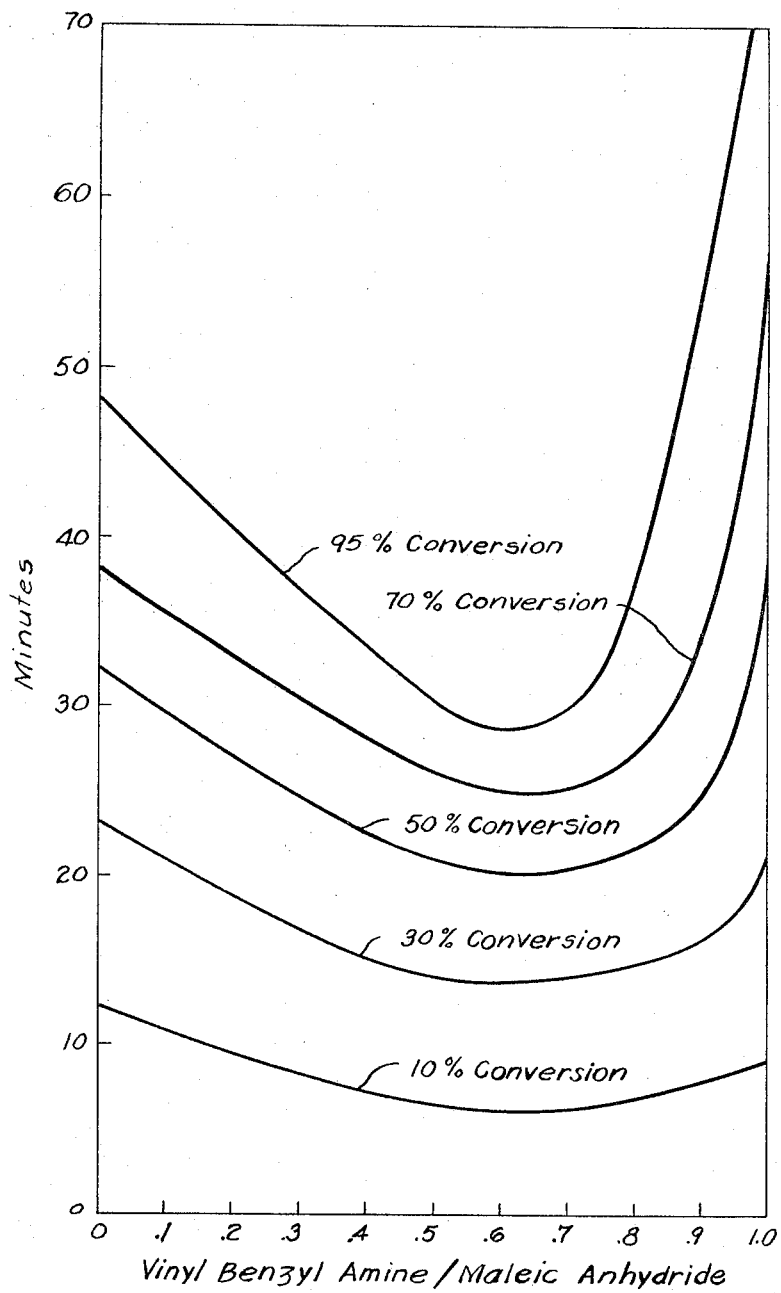
FIGURE 1 is a plot of the time required to reach various levels of polymerization at different ratios of vinyl amine to acid anhydride.

In preparing copolymers according to my invention a backbone copolymer of a vinyl compound and an $\alpha,\beta$-unsaturated dicarboxylic acid anhydrided having the reactive anhydrided groups is dissolved in vinyl monomer to produce a solution containing about 5–70 weight percent solids. These groups may be randomly spaced in the copolymer molecule with at least two anhydride groups per molecule. Copolymer molecules having too few anhydride groups do not provide the desired early gellation and high cure rate which is beneficial in using these materials, particularly in coatings and in laminates. Polymers having too many of these groups not only are sensitive to viscosity change upon the addition of the amine but also result in high cross-link density and embrittlement of the cured resin. The concentration of the acid anhydride in the backbone copolymer should be in the range of from 1 to 25 weight percent and preferably from about 5 to 13 weight percent.

The molecular weight of the backbone copolymer does not have any particular significance beyond the convenience of preparing a specific material. It must be soluble in the vinyl monomer to be copolymerized with it. Copolymers which are prepared for coatings or for laminating with glass fibers should have sufficient viscosity and gel strength to provide adequate retention of the mixture while it is being cured, yet have sufficient fluidity for convenience in application. On the other hand, molding compounds may be used with comparative facility at relatively high viscosity. For example, a viscous laminating resin might be prepared from a 5 weight percent solution of a high molecular weight backbone copolymer in vinyl monomer whereas a low viscosity coating material may embody the same concentration of a lower molecular weight copolymer. Thus, the backbone copolymer having the reactive vinyl groups attached via the amide linkage affords a convenient building block for reaction with vinyl monomers to produce copolymers having a wide latitude of uses and properties.

A random distribution of the anhydride groups in the copolymer molecule may be obtained by reacting the vinyl compound with the anhydride in a coil reactor wherein the monomers are passed through an elongated chamber maintained at the proper polymerization temperature. It may be necessary to maintain the concentration of the vinyl monomer in the reactor above the stoichiometric quantity to obtain the desired distribution of the anhydride groups in the polymer molecule. The excess unreacted vinyl monomer may be removed by devolatilization of the product copolymer.

The copolymer having reactive anhydride groups is then dissolved in a vinyl monomer to obtain a solution containing about 5–70 weight percent dissolved copolymer. A vinyl amine such as vinyl benzyl amine is then added to the solution to produce the half amide of the anhydride groups. The preferred amount of amine added should correspond to about 0.5–0.8 mole of amine per mole of anhydride in the copolymer although the properties of the copolymer are enhanced by as little as 0.1 mole and by as much as 1.0 mole, i.e., conversion of all anhydride groups to the half amide. The acylation reaction is fairly rapid and is accompanied generally by an increase in viscosity of the polymer solution. The amines ordinarily inhibit vinyl polymerization therefore copolymerization with the solvent vinyl monomer does not occur to a significant extent until the amine has been substantially completely converted to the amide, which is not a polymerization inhibitor. It may be desirable to produce the vinyl amide of the backbone copolymer in a non-reactive solvent such as benzene or toluene. The amide may be recovered from the solvent and stored for later use. At that time the amide would be dissolved in a vinyl monomer containing a free radical initiator, then heated to effect the polymerization or cure. Copolymerization of the vinyl monomer with the amine modified anhydride copolymer will occur over a period of several hours simply by heating the mixture to a temperature in the range of 60–90° C., however the rate of reaction can be accelerated substantially by incorporating about 0.1–3.0 weight percent of benzoyl peroxide or other free radical initiator.

The effect of amine concentration on polymerization time is illustrated in FIGURE 1. The data used in preparing the curves of this figure were obtained by determining the length of time required to reach various levels of conversion over a range of amine concentrations. These tests were made using a copolymer containing 94.1 weight percent styrene and 5.9 weight percent maleic anhydride dissolved in 60 weight percent o-chlorostyrene solution containing 1 weight percent benzoyl peroxide. The solution viscosity was 733 centipoises at 25° C. The copolymerization was conducted at 80° C. The molecular ratios of vinyl benzyl amine to maleic anhydride in the reaction mixtures are the abscissa values. These correlations reveal that backbone copolymers containing about 0.6 mole of the amine per mole of anhydride have the highest rate of copolymerization with the vinyl monomer. The effect is noticeable at the 10 percent conversion level and becomes more pronounced as the conversion level increases. The inhibiting effect of unconverted amine is thought to be responsible for the long reaction times at the high ratios of amine to anhydride, particularly at high conversion levels. The optimum reaction rate appears to lie between the molecular ratio of amine to anhydride of about 0.5 and 0.7.

Figure 2:
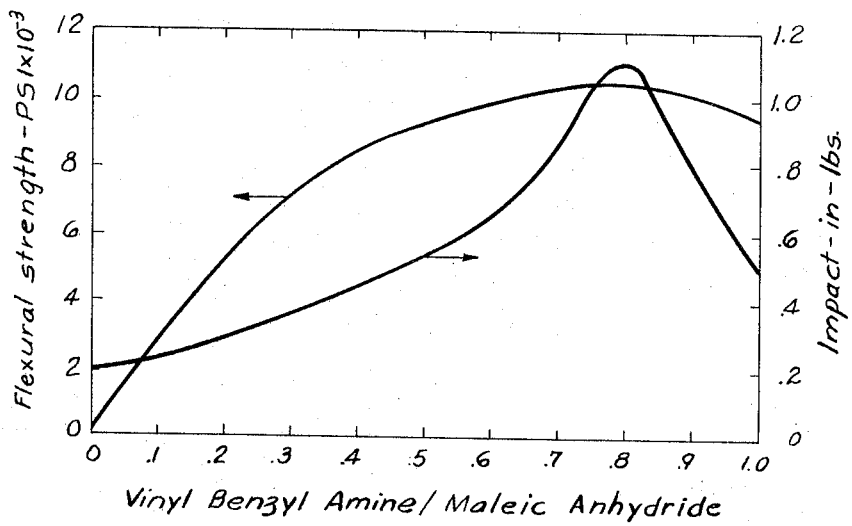
FIGURE 2 illustrates the effect of the ratio of vinyl amine to acid anhydride on the flexural and impact strength of the cross-linked resin.

The toughness of the resin as a function of the amine/anhydride ratio is shown in FIGURE 2. Data for this figure were obtained from samples of the same basic materials as were used in the tests reported in FIGURE 1. The copolymerization was effected by heating the reaction mixture at 80° C. for two hours in the presence of one percent benzoyl peroxide. The flexural strength values listed along the left ordinate should be multiplied by $10^3$ to get the actual value in pounds per square inch. The Izod impact values along the right ordinate are in units of inch-pounds and indicate the relative impact resistance of the various compositions. These results show the flexural strength of the backbone copolymer is increased by reaction with the vinyl amine and subsequent copolymerization with a vinyl monomer, the strength reaching a maximum when the amine/anhydride ratio is between about 0.5 and 1. The impact value is also increased, reaching a maximum when the mole ratio of amine to anhydride is about 0.8/1.

Figure 3:
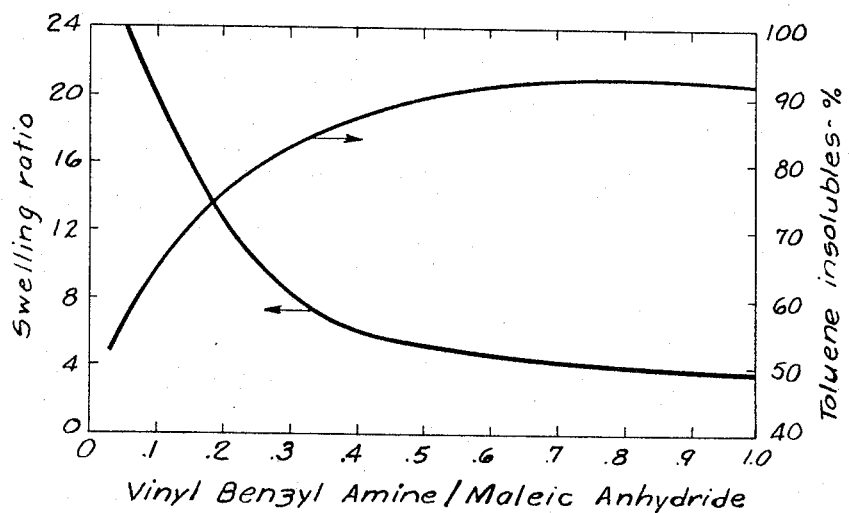
FIGURE 3 is a plot of swelling ratio and toluene solubility against the ratio of vinyl amine to acid anhydride which is an indication of the extent of cross-linking in the copolymer.

The extent of cross-linking is reflected in the two curves of FIGURE 3. The data for these curves were obtained from samples of the same polymers used in the tests reported in FIGURE 2. Samples of the polymers were immersed in toluene for seven days then the volume of the swelled polymer and the percent of the polymer which was insoluble were determined. The swelling ratio indicated along the left ordinate is the ratio of the volume of the swollen polymer to the original polymer volume. The insoluble portion was devolatilized then weighed to determine the insoluble fraction which is listed along the right ordinate as percent insoluble. These curves reflect the significant effect of cross-linking on the resistance of the polymer to solvents. The incremental effect is greatest at amine/anhydride ratios below about 0.5/1 with little further increase in solvent resistance at ratios above about 0.6/1.

From the foregoing it can be seen that a backbone copolymer of a vinyl compound and an $\alpha,\beta$-unsaturated dicarboxylic acid anhydride can be modified by reaction with a vinyl amine to produce a polymer containing unsaturated groups which can be copolymerized with another vinyl monomer having properties superior to those of the backbone copolymer. The superior resins are obtained through the proper choice of backbone copolymer composition and quantity of vinyl amine which primarily control the physical properties of the modified resin.

I claim:

1. A reactive copolymer consisting essentially of a backbone copolymer of an $\alpha,\beta$-unsaturated dicarboxylic acid anhydride and an alkenyl aromatic monomer wherein said backbone copolymer contains from about 1 to about 25 weight percent of said anhydride randomly distributed therein and from about 0.1 to about 1.0 mole of a vinyl amine monomer per mole of anhydride reacted therewith through an amide linkage with the reactive vinyl groups of said amine monomer pendant therefrom.

2. A modified copolymer consisting essentially of a backbone copolymer of an $\alpha,\beta$-unsaturated dicarboxylic acid anhydride and an alkenyl aromatic monomer wherein said backbone copolymer contains from about 1 to about 25 weight percent of said anhydride randomly distributed therein, and from about 0.1 to about 1.0 mole of a vinyl amine monomer per mole of anhydride reacted therewith through an amide linkage and the vinyl groups of said vinyl amine monomer copolymerized with an alkenyl aromatic compound.

3. A reactive copolymer according to claim 1 wherein said backbone copolymer contains from about 5 to about 13 weight percent of said anhydride and from about 0.5 to about 0.8 mole of said vinyl amine monomer.

4. A modified copolymer according to claim 2 wherein said backbone copolymer contains from about 5 to about 13 weight percent of said anhydride and from about 0.5 to about 0.8 mole of said vinyl amine monomer.

5. A reactive copolymer according to claim 1 dissolved in an alkenyl aromatic compound, the solution containing from 5 to 70 weight percent of the copolymer.

6. A reactive copolymer according to claim 1 wherein said anhydride is selected from the group consisting of maleic anhydride, citraconic anhydride and itaconic anhydride.

7. A reactive copolymer according to claim 1 wherein said vinyl amine monomer is vinyl benzyl amine.

8. A modified copolymer according to claim 2 wherein said vinyl amine monomer is vinyl benzyl amine.

9. A modified copolymer according to claim 2 wherein said anhydride is selected from the group consisting of maleic anhydride, citraconic anhydride and itaconic anhydride.

10. A method of modifying a copolymer of an alkenyl aromatic compound and an $\alpha,\beta$-unsaturated dicarboxylic acid anhydride containing from about 1 to 25 weight percent of said anhydride randomly distributed therein, the method comprising:

dissolving a copolymer thereof in a solvent alkenyl aromatic monomer, the concentration of said copolymer in said solvent monomer being in the range of from about 5–70 weight percent, adding to said solution from about 0.1–1 mole of a vinyl amine monomer per mole of anhydride in said copolymer to produce the half amide of the anhydride groups therein, thereafter adding about 0.1–3 weight percent of a free radical initiator as a polymerization catalyst, then heating said mixture to a temperature in the range 40–100° C. to effect the modification of said copolymer by copolymerization thereof with said solvent alkenyl aromatic monomer.

11. Reactive copolymer according to claim 7 wherein said backbone copolymer is a copolymer of styrene and maleic anhydride.

12. A modified copolymer according to claim 8 wherein said backbone copolymer is a copolymer of styrene and maleic anhydride.

13. A reactive copolymer according to claim 1 dissolved in monomeric styrene, and solution containing from 5 to 70 weight percent of the copolymer.

14. A modified copolymer according to claim 12 wherein said copolymer of maleic anhydride and styrene is dissolved in said alkenyl aromatic compound prior to reaction with said vinyl benzyl amine.

References Cited by the Examiner

UNITED STATES PATENTS

| | | | |
|---|---|---|---|
| 2,958,673 | 11/1960 | Jen | 260—885 |
| 2,977,334 | 3/1961 | Zopf et al. | 260—27 |
| 3,041,315 | 6/1962 | Gerlich et al. | 260—78 |
| 3,053,851 | 9/1962 | Ladd | 260—78 |
| 3,207,718 | 9/1965 | Zimmerman et al. | 260—29.6 |

FOREIGN PATENTS

| | | |
|---|---|---|
| 861,871 | 3/1961 | Great Britain. |
| 904,890 | 9/1962 | Great Britain. |

MURRAY TILLMAN, *Primary Examiner.*

J. T. GOOLKASIAN, *Assistant Examiner.*